March 14, 1933.  M. O. SNEDIKER  1,901,268
WATER MIXER
Filed Dec. 11, 1931
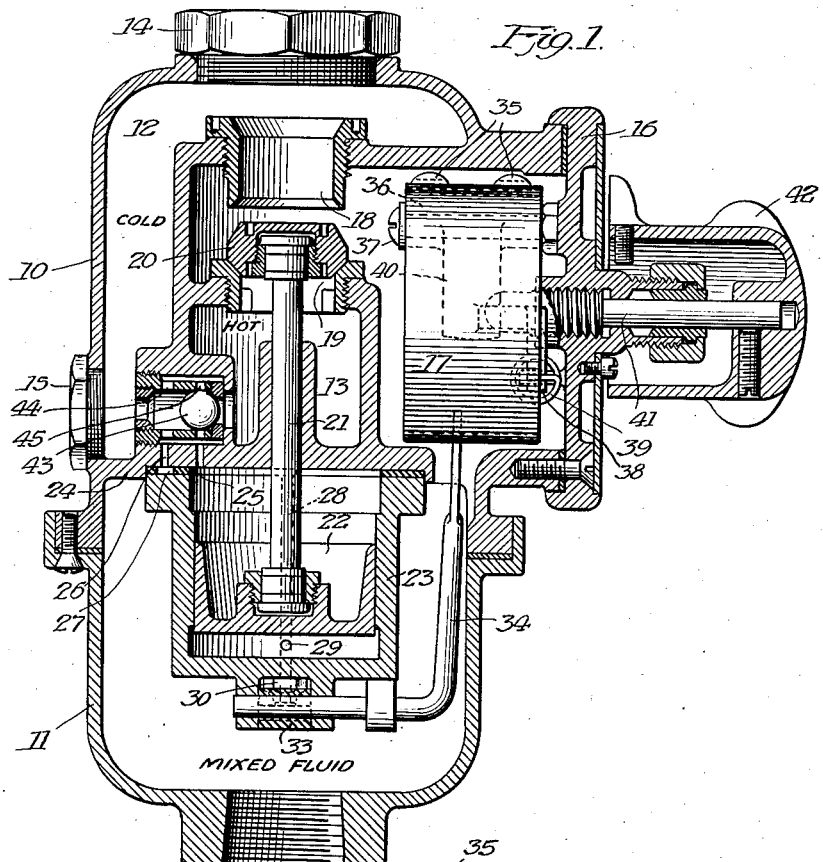
Fig. 1.
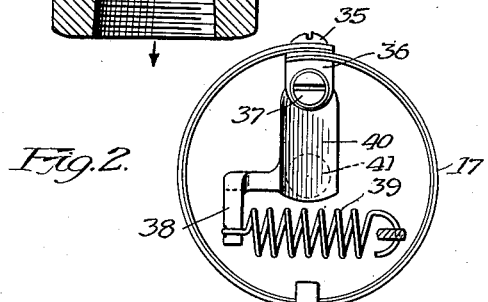
Fig. 2.
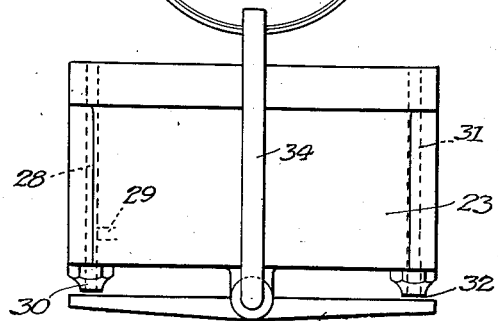
Witness
R. B. Davison
Inventor
Morton O. Snediker
By Mussey & Mussey
Attys.

Patented Mar. 14, 1933

1,901,268

UNITED STATES PATENT OFFICE

MORTON O. SNEDIKER, OF CHICAGO, ILLINOIS, ASSIGNOR TO THE POWERS REGULATOR COMPANY, OF CHICAGO, ILLINOIS, A CORPORATION OF ILLINOIS

WATER MIXER

Application filed December 11, 1931. Serial No. 580,363.

My invention relates to mixing valves and particularly to a novel thermostatically controlled valve of this character in which the variations in the supply pressure of the hot and cold fluids are equalized. The construction here proposed is an improvement on that shown in my issued Patent No. 1,819,045 of August 18, 1931.

In laundries or other establishments where large quantities of hot or warm water are required and where the supply is tapped at various points in the establishment at irregular times, there results a fluctuation in the supply pressure of the hot and cold fluids, and the device here disclosed is intended to compensate for such changes and to effect an instant adjustment that will maintain a substantially uniform temperaure, even though slightly restricting the flow in case of a substantial unbalancing of the entrance pressure of the hot and cold fluids.

In the apparatus disclosed in my prior patent heretofore referred to, the device was satisfactory under many conditions of operation. However, under other operating conditions the response of the device to changes in pressure and temperature were not sufficiently prompt. This was due partly to the fact that the thermostatic element was located at a point a considerable distance removed from the point of mixing of the two fluids; thus a change of temperature was not reflected in the change of adjustment until a substantial volume of water had been discharged. In the device here disclosed the thermostatic element is located immediately adjacent to the mixing valve so that any change of temperature is at once effective to change the pressure conditions above and below the valve-controlling piston.

I have also improved the method of equalizing the entrance pressures of the two fluids, thus avoiding the extra piping employed in the construction of my prior patent.

The invention will be more readily understood by reference to the accompanying drawing, in which:

Fig. 1 is a vertical sectional view through a device constructed in accordance with my invention;

Fig. 2 is a face view, with the casing removed, of the thermostatic control and the means for manually regulating the same.

In the drawing, I have shown a housing or casing consisting of an upper section 10 and a lower section 11 suitably joined, as shown. The upper section contains threaded openings (not shown) for admitting cold fluid into the chamber 12 and hot fluid into the chamber 13, these openings appearing on diametrically opposite sides of the casing in such position that they do not appear in Fig. 1. The upper casing has threaded openings closed by caps 14 and 15 that provide for access to the different valves and valve seats.

At one side the upper casing has a large flanged opening closed by a plate 16 within which opening is received the thermostat and the regulating device therefor. This arrangement serves to position the thermostat, indicated at 17, closely adjacent to the cold water inlet 18 and the hot water inlet 19, the mixed fluids flowing directly against the thermostat as they pass the mixing valve 20 toward the outlet.

The mixing valve is carried by a stem 21, to the lower end of which is secured a piston 22. This piston reciprocates within a cylinder 23 bolted to the dividing wall 24 in the upper casing. This dividing wall has two ports or passages 25, 26 the former being in open communication with the space above the piston 22, while the latter is in communication through the passages 27, 28 and the lateral port 29, with the space beneath the piston. The passage 28 is continued downwardly through the cylinder wall and terminates in a discharge port 30 while the passage 31 on the opposite side of the cylinder wall is open at its upper end to the space above the piston and has a discharge port 32 at its lower end. The discharge ports 30, 32 are alternately opened or closed, depending upon the position of the rocker 33, the vertical arm 34 of which lies between the two ends of the bi-metal thermostat 17. This thermostat is composed of two semi-circular sections joined by screws 35 to the rocker 36 that is pivoted on the bolt 37. An arm 38 connected to the rocker provides means for attachment of a coil spring 39, the opposite end of which is secured to the plate 16. The rocker provides an inclined or cam surface 40, adapted to be contacted by the threaded stem 41 which is fixed to a knob 42. As the stem is moved inward or outward the position of the thermostat is changed the function of the spring 39 being merely to hold the rocker firmly against the end of the stem 41. The two sections of the thermostat act in opposite directions due to the reversal of the position of the two metals.

It will be noted that the arm 34 merely lies between the two ends of the bi-metal, semi-circular pieces and that the thermostat and all related parts are mounted upon the plate 16. Thus the thermostat and control elements can be removed from the casing by a removal of the plate 16.

The ports 25, 26 in the dividing wall are controlled by means of a ball valve 43, located in a sleeve threaded into a chamber in an inner wall of the upper casing. The two ends of the sleeve are open, respectively, to the hot and cold chambers and the ball in either of its two extreme positions serves to close one or the other of the ports 44, 45 in the sleeve. It will be noted that the sleeve is spaced away from the wall containing the ports 25, 26 and that both ports 25, 26 are in communication with said space. If the cold water pressure exceeds the hot, the ball will be in the position shown in the drawing. The cold fluid may then pass to both sides of the piston. Thus, it being assumed that the mixed fluid is below the temperature for which the thermostat is set, the rocker 33 will have been moved, closing the outlet port 30 and opening the outlet port 32, which is open to the top side of the piston. In that event pressure will immediately be effective against the underside of the piston causing it to raise and restrict the supply of cold fluid entering past the valve 20. In the event the hot fluid pressure should exceed that of the cold fluid the ball 43 will be immediately shifted to the opposite end of the sleeve and shut off the pressure of cold fluid, such excessive hot fluid pressure resulting in a reversal of the movement of the piston. Of course, in the event of the complete shut off of either the hot or cold fluids the mixing valve will be moved to an extreme position and no fluid will pass the valve.

The important points of advantage in the construction disclosed are, first, the positioning of the thermostat element immediately at the outlet from the mixing valve, second, the simple construction of the pressure balancing valve, and third, the simplified arrangement by which the various parts are all readily accessible without removing the device from its location in the pipe lines.

I claim:

1. In combination, a casing having a mixing valve and a piston for controlling the same and provided with hot and cold fluid chambers and connections thereto for hot and cold fluid supply lines, a thermostat immediately adjacent to the outlet from the mixing valve, a pilot valve operated by said thermostat for controlling the admission of fluids to both sides of said piston, and means within the casing, sensitive to an unbalanced pressure condition in the hot and cold supply lines for utilizing the fluid having the dominant pressure for positioning said piston under the control of said pilot valve.

2. In combination, a casing having a mixing valve, said casing having a lateral opening in substantially the lateral plane of said mixing valve, a plate for closing said opening, a thermostat and regulating devices attached to said plate, and removable therewith, a piston for positioning said mixing valve, a pilot valve, and means operable by said thermostat for positioning said pilot valve to move said piston according to the dominant pressure of the supply fluids.

3. In combination, a casing having hot and cold fluid inlets in its sides and a mixed fluid outlet at its end, a mixing valve within the casing located near its upper end, a thermostat projected into the casing in substantially the plane of the mixing valve, a piston for operating said valve and a pilot valve operated by said thermostat for controlling the position of said piston.

4. In combination, a casing having hot and cold fluid inlets in its sides and a mixed fluid outlet at its end, a mixing valve within the casing located near its upper end, a bi-metal thermostat projected into the casing in substantially the plane of the mixing valve, a piston for operating said valve and a pilot valve operated by said thermostat for controlling the position of said piston.

5. A device for maintaining a substantially constant temperature of mixed fluids from hot and cold fluids supplies that fluctuate, comprising, in combination, a casing having hot and cold fluid inlets and a mixed fluid outlet, a thermostat in said casing adjacent to the mixing valve, a piston for positioning said mixing valve, a pilot valve positioned by said thermostat for controlling the application of pressure to both sides of said piston, and a pressure-compensating-valve for supplying fluid from the dominant pressure to the two sides of said piston under the control of said pilot valve.

6. A device for maintaining a substantially constant temperature of mixed fluids from hot and cold fluid supplies that fluctuate, comprising, in combination, a casing having hot and cold fluid inlets and a mixed fluid outlet, a thermostat in said casing adjacent to the mixing valve, a piston for positioning said mixing valve, a pilot valve positioned by said thermostat for controlling the application of pressure to both sides of said piston, and a ball check-valve within the casing for supplying fluid from the dominant pressure to the two sides of said piston under the control of said pilot valve.

In testimony whereof I have affixed my signature.

MORTON O. SNEDIKER.